United States Patent [19]

Paros

[11] 4,455,874
[45] Jun. 26, 1984

[54] DIGITAL PRESSURE TRANSDUCER
[75] Inventor: Jerome M. Paros, King, Wash.
[73] Assignee: Paroscientific, Inc., Redmond, Wash.
[21] Appl. No.: 334,649
[22] Filed: Dec. 28, 1981
[51] Int. Cl.³ .............................................. G01L 11/00
[52] U.S. Cl. ...................................... 73/704; 73/733; 73/742; 73/743
[58] Field of Search .................. 73/704, DIG. 1, 733, 73/736, 737, 735

[56] References Cited
U.S. PATENT DOCUMENTS 3,470,400  9/1969  Weisbord ........................ 73/DIG. 1
3,479,536 11/1969  Norris .............................. 73/DIG. 1
3,618,391 11/1971  Rivkin et al. ........................ 73/704

FOREIGN PATENT DOCUMENTS 0037654 10/1981  European Pat. Off. .................. 704/

Primary Examiner—Donald O. Woodiel
Attorney, Agent, or Firm—Seed and Berry

[57] ABSTRACT

A digital pressure transducer is formed by mounting a force-sensitive resonator to a structure of nonsymmetrical configuration which produces loads under applied pressure. The frequency of the resonator is measured to provide a digital indication of the applied pressure.

25 Claims, 15 Drawing Figures

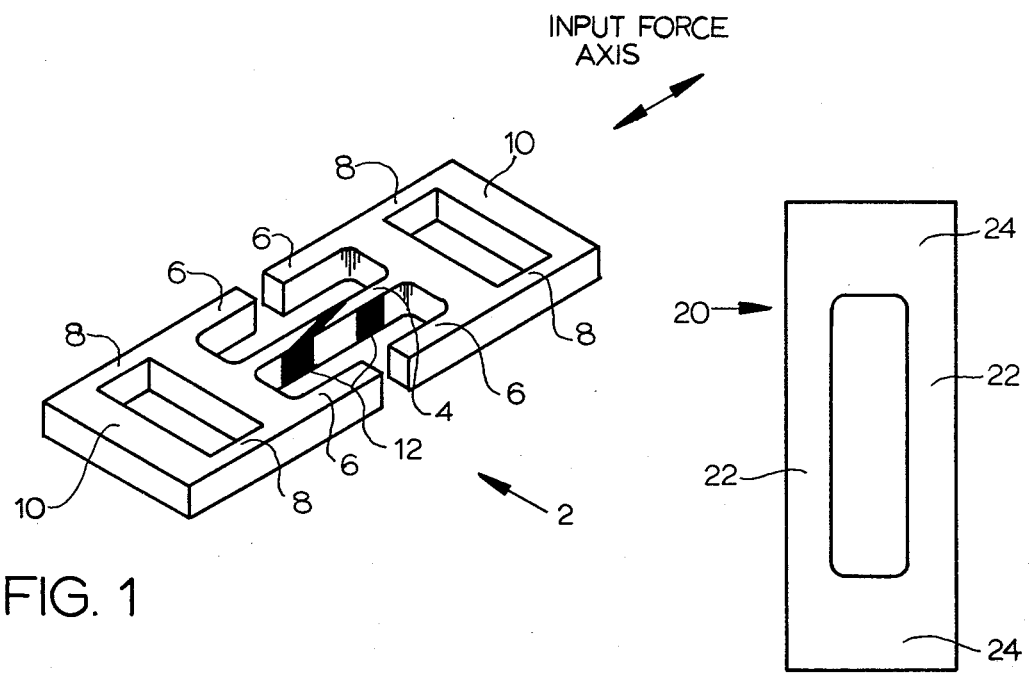
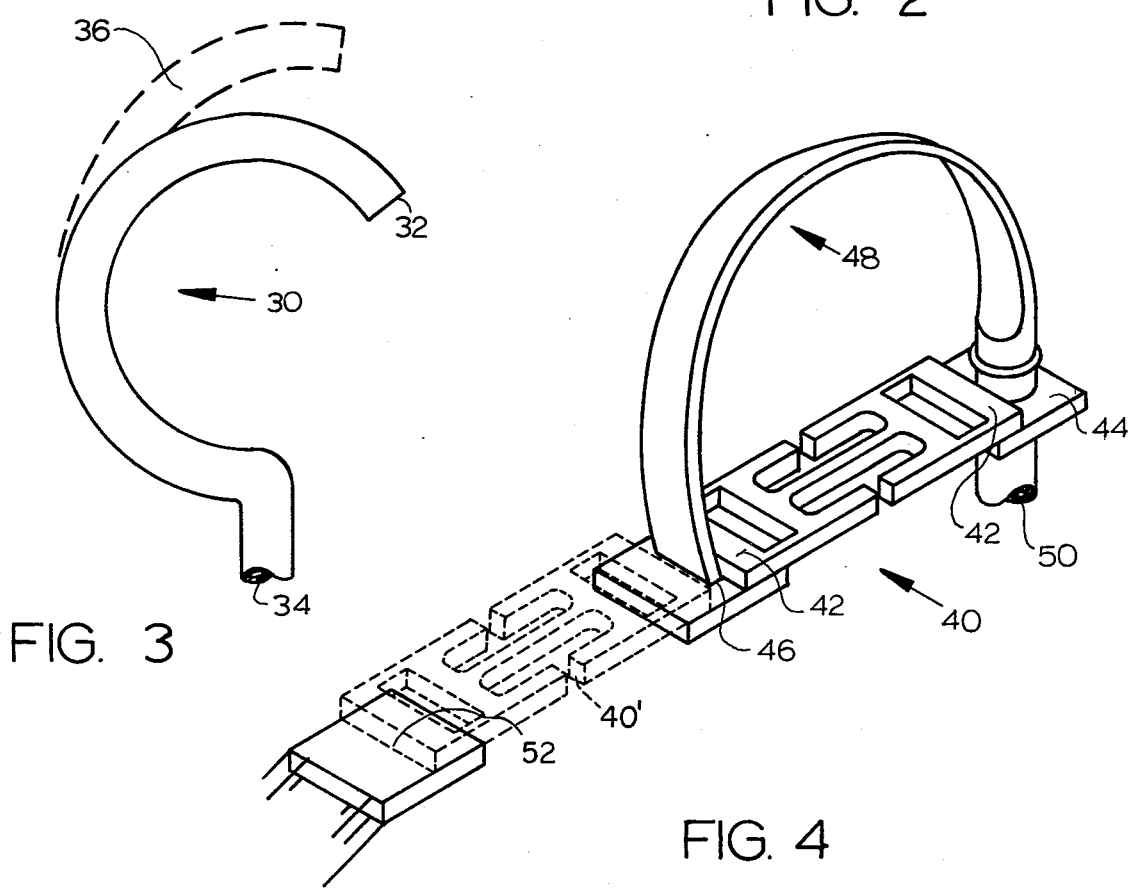

DIGITAL PRESSURE TRANSDUCER

DESCRIPTION

1. Technical Field

This invention relates to a new and improved pressure sensor and, more particularly, to a pressure transducer utilizing a force-sensitive resonator that generates a digital output.

2. Background Art

The widespread use and continuing trend toward digital information and control systems, together with the need for more accurate pressure instrumentation, prompted the invention of a new digital pressure transducer capable of meeting the following design and performance requirements: (1) digital-type output, (2) high resolution and accuracy, (3) reliable and simple design, (4) insensitivity to environmental factors, and (5) minimum size, weight, and power consumption.

Existing transducers capable of generating a digital output can be classified as: (1) inherently digital (i.e., those instruments in which pressure or pressure-induced forces produce or modify a digital pattern to directly yield a digital-type output) or (2) convertably digital (i.e., those devices whose output can be transformed to a digital signal). In the latter category, the instruments generally employ pressure-sensing elements, such as liquid columns, Bourdon tubes, diaphragms, and bellows, in conjunction with detection or pickoff techniques, such as potentiometric, strain gauge, capacitive, inductive, reluctive, or optical. The liquid column devices are large, with slow response time, and sensitive to environmental factors. The other instruments generally produce an analog voltage output which may be transformed with an A/D converter to the desired digital signal. These open loop devices do not yield the required accuracy, and the A/D converter further degrades the performance and decreases reliability. Closed-loop or force-balance transducers have been made which yield better results due to the relatively reduced movements; however, these sensors are more complex, power consumption varies with pressure loading, and either an A/D converter or pulse-torquing techniques must be employed to obtain the digital output. Serious drawbacks include sensitivity to vibration, temperature, and electromagnetic interference as well as null and scale factor instabilities.

The category of inherently digital devices includes various vibratory elements, such as strings or tapes, cylinders, diaphragms, and thin-walled capsules, as well as electronic oscillators employing inductive or capacitance sensors as part of a resonant circuit. The resonant circuit devices suffer from poor repeatability and hysteresis due to the relatively large pressure-induced deflections, and usually are temperature controlled due to a high thermal sensitivity. Vibration yields large error outputs, and null stability is poor due to creep, mechanical stress relaxation, and circuit component aging. Vibrating strings, cylinders, diaphragms, and capsules generally employ electromagnetic means of maintaining the oscillations, necessitating shielding from external magnetic fields. Since the vibrating strings cannot sustain any compressive forces, they must be prestressed at tension levels greater than the maximum compressive pressure loads. Such high loads necessarily cause creep with excessively large null instability. Without a counterbalancing acceleration compensation arrangement, these transducers may be susceptible to external forces.

Vibrating diaphragm, cylinder and capsule transducers are sensitive to temperature, vibration, and gas composition. Most of these devices cannot measure liquid pressures because the sensing element must work in a vacuum. Null and scale factor instabilities are a general problem since large frequency drifts of vibratory systems such as these are common.

Quartz resonator pressure gauges have been built which have an inherently digital output, as described in Karrer et al, "A Quartz Resonator Pressure Transducer," IEEE Trans. Ind. Elec. and Control Instr., Vol. 16, 44 (1969), and EerNisse, "Quartz Resonator Pressure Gauge: Design and Fabrication Technology," Sandia Laboratories SAND 78-2264 (December 1978). These devices consist of a thickness-shear mode plate resonator enclosed by two hollowed-out quartz end caps. Hydrostatic pressure applied to the transducer generates a radially directed force around the perimeter of the resonator and changes the resonator's frequency of oscillation. These transducers have a relatively low sensitivity to the applied load; i.e., the fractional frequency change with full-scale applied pressure is quite small (generally a fraction of one percent). The low sensitivity means that the susceptibility to environmental errors, such as temperature, is large. These transducers are also expensive and difficult to fabricate.

As described in Paros, "Digital Pressure Transducers," Measurements and Data, Issue 56, Vol. 10, No. 2 (1976), quartz crystal pressure transducers have been developed in which a bellows/suspension system arrangement applies pressure-induced stress to a flexurally vibrating resonator. Although these resonators have a much greater force sensitivity than the aforementioned thickness-shear mode crystals, the overall transducer is limited in pressure range, temperature capability, and interface with corrosive pressure media.

The prior art devices cannot meet the desired objectives of an inherently digital-type output, high sensitivity, excellent accuracy and stability, low power consumption, small size and weight, fast response time, small environmental errors, ability to measure corrosive fluid pressures, high reliability, and low cost.

In an unstressed condition, under constant environmental conditions, a load-sensitive resonator has a unique resonant frequency determined by its dimensions and material composition. The resonant frequency of a flexurally vibrating resonator increases under tensile loading and decreases under compressive loading. A number of load-sensitive transducers utilizing this principle have been developed.

Force-sensitive crystals in which loads are applied to the crystals near the nodal points are described in U.S. Pat. No. 2,984,111, issued to Kritz, and U.S. Pat. No. 3,093,760, issued to Tarasevich.

U.S. Pat. No. 3,470,000, issued to Weisbord, describes a single-beam force transducer with an integral mounting system which effectively decouples the beam vibrations from the mounting points through a spring and mass arrangement.

U.S. Pat. No. 3,238,789, issued to Erdley, and U.S. Pat. No. 4,215,570, issued to EerNisse, disclose two tines or bars vibrating 180 degrees out of phase such that the reactive forces and moments cancel.

A number of conventional devices utilize a nonresonant displacement-sensing device to measure displacement of a Bourdon tube responsive to variations in applied pressure. For example, U.S. Pat. No. 3,013,234 describes a device which measures the pressure-induced displacement of a Bourdon tube by mounting a capacitor plate or resistive winding on the tube so that its position with respect to a second capacitor plate or potentiometer wiper varies in accordance with applied pressure. Similarly, U.S. Pat. No. 2,877,325 discloses a pressure transducer in which a potentiometer wiper is mounted at the end of a Bourdon tube so that it moves along the potentiometer winding responsive to pressure variations. U.S. Pat. No. 576,208 discloses a similar concept in which an arm mounted at the end of a Bourdon tube sequentially contacts various taps of a resistance coil as the applied pressure varies. All of these conventional devices are inherently inaccurate, and they are affected by a variety of environmental factors.

DISCLOSURE OF INVENTION

It is an object of this invention to provide a pressure transducer with an inherently digital-type output.

It is another object of this invention to provide a pressure transducer of small size and weight, low power consumption, and rapid response time.

It is still another object of this invention to provide a pressure transducer with high reliability and low cost.

These and other objects of the invention are accomplished through mounting systems and arrangements which apply pressure-induced mechanical stress to load-sensitive resonators. One or more load-sensitive resonators are coupled to a pressure vessel of nonsymmetrical configuration such that pressure-induced bending stress/strain changes the resonators' frequency of vibration. The nonsymmetrical configuration may assume either a nonsymmetrical construction, such as pressure vessels having a spring constant that varies around its circumference, or a nonsymmetrical shape, such as a curved pressure vessel. In one embodiment, the resonator is mounted directly on the pressure vessel. In another embodiment, the forces generated by the aforementioned pressure vessels may be directly applied to resonators mounted between the pressure vessel and base structures. In yet another embodiment, the forces generated by the aforementioned pressure vessels may be applied to intermediate pivotally mounted structures to which the resonators are attached. In yet another embodiment, a pressure vessel enclosing a load-sensitive resonator is suspended from a base structure such that pressure-induced loads are applied to the resonator.

BRIEF DESCRIPTION OF THE DRAWINGS

FIG. 1 is an isometric view illustrating a conventional single-beam force transducer with integral mounting isolation.

FIG. 2 is a plan view illustrating a conventional closed-end tuning fork sensor.

FIG. 3 is a plan view illustrating the effects of applied pressure on a Bourdon tube formed by a closed-end, curved pressure vessel having a noncircular cross-section.

FIG. 4 is an isometric view illustrating a load-sensitive resonator mounted to a C-shaped Bourdon tube.

BEST MODE FOR CARRYING OUT THE INVENTION

Figure 5A:
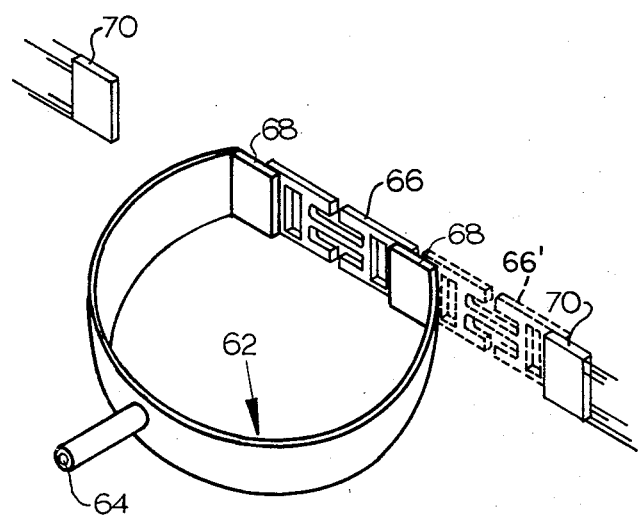
FIG. 5A is an isometric view illustrating a load-sensitive resonator attached to a U-shaped Bourdon tube.

The present invention is equally applicable to load-sensitive resonators of various shapes and configurations; however, for simplicity and clarity, only the application to flexurally vibrating, force-sensitive beam and closed-end tuning fork devices will be described in detail, it being understood that the same or similar principles apply in the general case.

FIG. 1 illustrates a conventional single-beam force transducer 2 with integral mounting isolation, as disclosed in the aforementioned patent to Weisbord. The transducer 2 consists of a flexurally vibrating center beam 4, two sets of isolator masses 6, and isolator springs 8 extending from each end of the beam 4 to mounting surfaces 10. Axial forces, applied along the longitudinal axis of the transducer 2, stress the vibrating beam 4, thereby changing its resonant frequency in accordance with the magnitude of the applied loads. The isolator masses 6 and isolator springs 8 are designed to decouple the reactive forces and moments generated by the beam 4 from mounts 10, thus reducing the energy losses. As a result, the transducer 2 has a high "Q" so that its resonant frequency is an accurate representation of the applied forces. The beam 4 may be driven at its resonant frequency using electrodes 12 and oscillator circuitry in any conventional manner, such as is described in U.S. Pat. No. 3,479,536, issued to Norris.

FIG. 2 is a plan view of a conventional closed-end tuning fork 20, as described in the aforementioned patent to Erdley. This device 20 achieves low energy loss, high "Q" operation by driving a pair of closely matched tines 22, 180 degrees out of phase, thus cancelling the reactive moments and forces which might be transmitted to a mount 24 from which the tines 22 project.

Under constant environmental conditions, the resonant frequency to Hertz, $f_o$, of a unstressed, fixed-ended, flexurally vibrating beam of length L, thickness t, width b, modulus of elasticity E, and density d, is given by the formula:

$$f_o = (\text{Constant}) \ t/L^2 \sqrt{E/d} \qquad \text{(Equation 1)}$$

Although the resonant frequency is generally a nonlinear function of the applied load F, the first-order load sensitivity $S_F$, defined as the fractional frequency change with applied load, may be calculated as:

$$S_F = (\text{Constant}) \, L^2 F / Ebt^3 \qquad \text{(Equation 2)}$$

The quantitative relationships between resonant frequency, applied load, and resonator dimensions and composition can be determined from the above formulae. In particular, pressure-induced mechanical stress may be applied to load-sensitive resonators to form digital pressure transducers.

Equation 2 may be rewritten in terms of resonator stress $\sigma$ as:

$$S_\sigma = (\text{Constant}) \, L^2 \sigma / t^2 E \qquad \text{(Equation 3)}$$

Within the elastic limit, the resonator stress equals the modulus of elasticity E times the resonator strain $\epsilon$, and Equation 3 may be written as:

$$S_\epsilon = (\text{Constant}) \, L^2 \epsilon / t^2 \qquad \text{(Equation 4)}$$

Thus, strain, such as that produced by the pressure-induced bending of a curved, closed-end, noncircular cross-section pressure vessel, can change the resonant frequency of a load-sensitive resonator.

The load on the resonator may be either compressive or tensile, causing a frequency decrease or increase, respectively. If two resonators are attached to the load generator in either a dual bending or push-pull (compression-tension) arrangement, then performance advantages may result by computing the difference (beat) frequency between the two resonators or the difference between the squares of the two frequencies. The aforementioned performance advantages include an improvement in linearity as well as compensation for effects due to temperature, humidity, drift, etc., which affect both resonators equally.

FIG. 3 illustrates a curved pressure vessel 30 of noncircular cross-section with closed end 32. When pressure is applied to port 34, the flattened tube tends to uncurl to a position 36 shown by the dashed lines. This pressure vessel is known as a C-shaped Bourdon tube and is similar to Bourdon tubes commonly used as the sensing element in mechanical gauges and analog output transducers. However, Bourdon tubes used in mechanical gauges and analog output transducers are usually formed by a significantly longer tube arranged in multiple coils so that the end of the tube is displaced a considerable distance responsive to pressure variations. This is necessary to allow the relatively insensitive and inaccurate mechanical gauges and analog transducers to measurably respond to the pressure-induced movement of the tube. As illustrated in subsequent figures, load-sensitive resonators may be attached to restrain the uncurling and bending forces to provide a measure of the applied pressure.

FIG. 4 illustrates an embodiment of this invention in which a load-sensitive resonator 40, with mounting pads 42, is attached between the base 44 and the closed end 46 of the C-shaped Bourdon tube 48. When pressure is applied to port 50, the flattened tube 48 generates forces tending to uncurl or straighten the pressure vessel. These forces are resisted by the resonator 40, whose change in frequency of oscillation is a measure of the applied pressure. As illustrated, the resonator 40 is placed in tension with pressure applied to port 50. If the resonator were attached between closed end 46 and fixed base 52, then applied pressure would compress the resonator. A push-pull, two-resonator system could be constructed with a resonator undergoing compression mounted between points 46 and 52 as shown in phantom in FIG. 4 and a resonator undergoing tension mounted between points 46 and 44.

FIG. 5A illustrates an embodiment of this invention in which a U-shaped Bourdon tube 62 with a centrally located pressure port 64 applies pressure-induced tensile loads to a resonator 66 which is attached between the mounts 68 at the closed ends of the pressure vessel. If a resonator were attached between one of the mounts 68 and its respective fixed base 70, as shown in phantom in FIG. 5A then it would be compressed under applied pressure-induced loading. Thus a multiple-resonator, push-pull system could also be constructed.

Figure 5B:
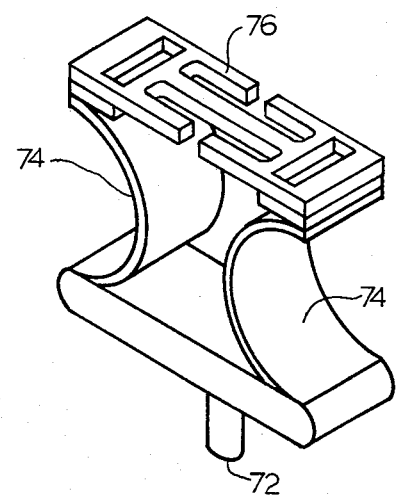
FIG. 5B is an isometric view illustrating a load-sensitive resonator mounted between two Bourdon tube segments which apply compressive forces to the resonator.

FIG. 5B shows an embodiment in which pressure applied to port 72 communicates internally to flattened tubes 74 to cause compressive loading on resonator 76. An advantage of symmetrically suspending the resonator between oppositely bending tubes is a reduction in sensitivity to cross-axis acceleration errors.

Figure 6:
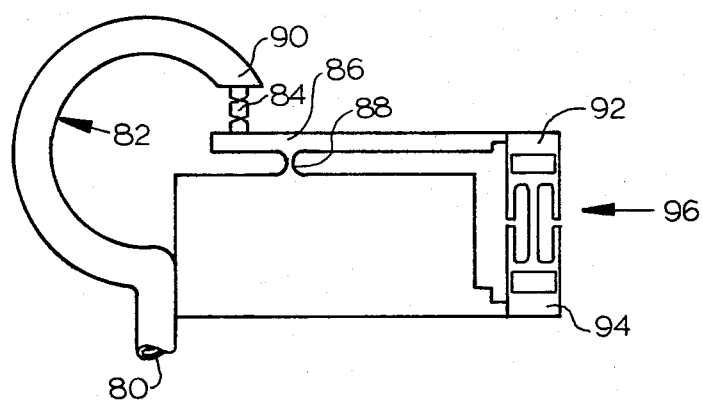
FIG. 6 is a plan view illustrating a C-shaped Bourdon tube applying loads to a load-sensitive resonator through an intermediate pivotally mounted suspension system.

FIG. 6 illustrates an embodiment of this invention in which pressure applied to the inlet port 80 of a curved, noncircular cross-section pressure vessel 82 generates an upward force on flexible linkage 84, which is connected between the closed end 90 of the pressure vessel and pivotally mounted suspension arm 86. The pressure-generated force on suspension arm 86 causes a torque about pivot 88. Pivot 88 is very flexible about an axis perpendicular to the plane of the illustration, but is relatively stiff in the cross-axis directions. The torque is restrained by load-sensitive resonator 96, which is attached between mounting pad 92 on the suspension arm 86 and mounting pad 94 on the fixed base. As shown, pressure-induced compressive loading on the resonator changes its frequency of oscillation, which is a measure of the applied pressure. If a load-sensitive resonator were attached between mounting pads 92 and 98, then the resonator would be placed under tension with applied pressure. Thus it is also possible to have a two-resonator, push-pull arrangement. Different pressure range instruments may be constructed by varying the lever arm ratio on the pivotally mounted suspension arm 86 (i.e., the ratio of the horizontal distance between linkage 84 and pivot 88, and the horizontal distance between pivot 88 and resonator 96).

Figure 7:
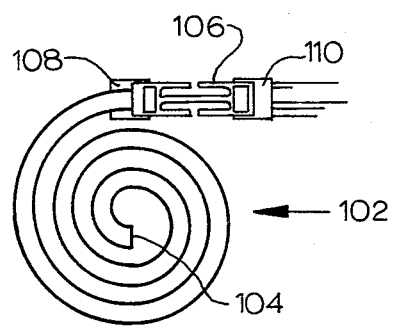
FIG. 7 is a plan view illustrating a spiral Bourdon tube with an attached load-sensitive resonator.

In order to increase the motion sensitivity of mechanical gauges employing Bourdon tubes, the tubes may be coiled in a helical pattern or spiral configuration. With a load-sensitive resonator restraining the motion, the total excursion under full-scale load is only several micrometers. An advantage of a multiple-turn pressure vessel is to reduce its overall reactive mechanical spring rate, which could degrade the resonator performance. FIG. 7 depicts a spiral Bourdon tube 102, with pressure inlet port 104 and resonator 106 attached between closed end 108 and fixed base 110. When pressure is applied to port 104, the pressure vessel tends to uncoil and applies a tensile load to resonator 106, whose frequency change is a measure of the applied pressure. As described previously, compressive loading arrangements and multiple-resonator, push-pull configurations are also possible.

Figure 8:
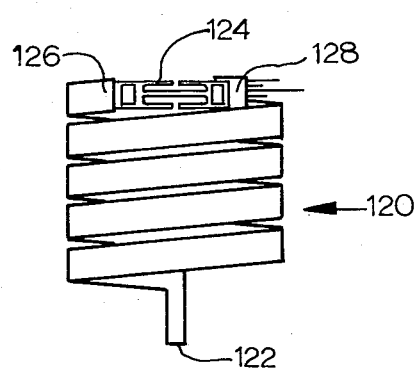
FIG. 8 is an isometric view illustrating a helical Bourdon tube with an attached load-sensitive resonator.

FIG. 8 depicts a pressure vessel 120 of noncircular cross-section which has been formed into a helical pattern. Pressure applied to port 122 causes vessel 120 to exert an unwinding force on resonator 124, which is attached between closed end 126 and fixed base 128.

Figure 9:
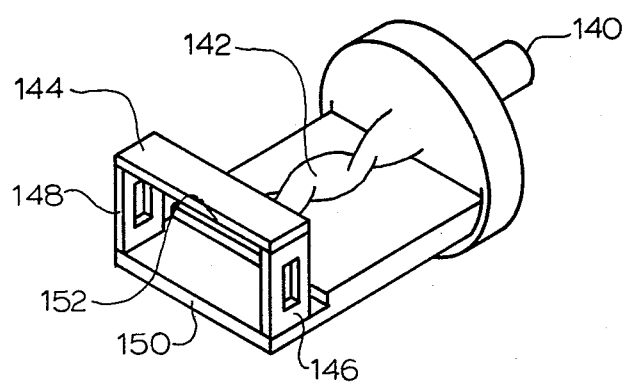
FIG. 9 is an isometric view illustrating a torsionally-acting, flattened, and twisted pressure vessel with an attached push-pull dual resonator sensing system.

FIG. 9 illustrates a digital pressure transducer employing a push-pull, dual-resonator sensing system with a torsionally acting, flattened, and twisted pressure vessel. When pressure is applied to port 140, the tube 142 exerts a torque as it tries to untwist. Arm 144, attached to the closed end of tube 142, exerts a tensile load on resonator 146 and a compressive load on resonator 148, where both resonators are spaced apart from the axis of twisting and attached between arm 144 and fixed base 150. The difference between the frequencies of oscillation of resonators 146 and 148 is a measure of the applied pressure. As discussed previously, alternate configurations may employ a single load-sensitive resonator operating in either compression or tension. In order to reduce the sensitivity to external acceleration, a torsional support may be employed at position 152 which allows free rotation about the twisting axis but offers relatively rigid support in other directions.

Figure 10:
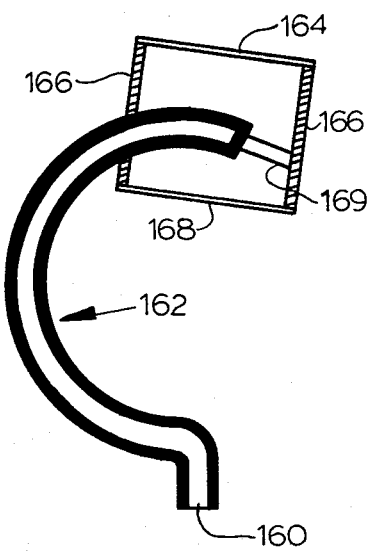
FIG. 10 is a plan view illustrating a C-shaped Bourdon tube applying bending strain to load-sensitive resonators.

FIG. 10 illustrates an embodiment of this invention in which the pressure-induced bending strain of a curved, closed-end, noncircular cross-section pressure vessel loads a force-sensitive resonator. When pressure is applied to the inlet port 160 of C-shaped Bourdon tube 162, a compressional strain is applied to load-sensitive resonator 164 through the attachment mounts 166. The pressure-induced strain causes a frequency change in the resonator according to Equation 4 of this text, thus providing a measure of the pressure. Tensile strain may be applied to a resonator 168 by attaching it to mounts 166 inside the curve of the pressure vessel 162. As discussed previously, the beat frequency between resonator 168 in tension and resonator 164 in compression is a measure of the applied pressure and may also serve to compensate sources of error common to both resonators. In order to fully compensate for nonlinearities and common sources of error, the scale factors (pressure-loaded sensitivities) of resonators 164 and 168 may be made equal by adding or removing material from the top or bottom of extension 169, which transmits the bending force from the tube 162 through mounts 166 to the resonators. Removal or addition of material to one side of extension 169 essentially moves the neutral axis of bending towards one resonator and away from the other resonator. The scale factors of resonators 164 and 168 may also be adjusted through changes in the rigidity of one side of mounts 166 such that the bending strain is not completely transmitted to one or the other of the resonators.

Figure 11:
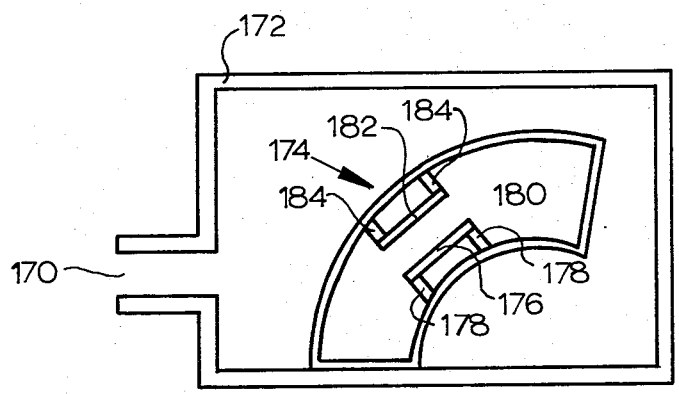
FIG. 11 is a plan view illustrating a pressure vessel applying strain to internally mounted, load-sensitive resonators.

Although previous examples have shown the pressure being applied internal to the pressure vessels, with the load-sensitive resonators attached externally, it is possible to reverse the situation, as shown in FIG. 11. When pressure is applied to port 170 of housing 172, the sealed, curved pressure vessel 174 of noncircular cross-section tends to curl to a smaller radius of curvature. The bending strain so produced applies stress to load-sensitive resonator 176, which is attached to pressure vessel 174 through mounts 178. The change in resonant frequency is a measure of the applied pressure. The resonator 176 may operate in a vacuum or inert atmosphere 180 contained within pressure vessel 174. As shown in FIG. 11, resonator 176 has tensile loads applied with pressure. A resonator 182 may be attached with mounts 184 to the side of pressure vessel 174, having the larger radius of curvature. Under applied pressure, compressive strain/stress is generated on resonator 182. Thus, a push-pull, dual-resonator arrangement is also possible with this configuration.

Figure 12:
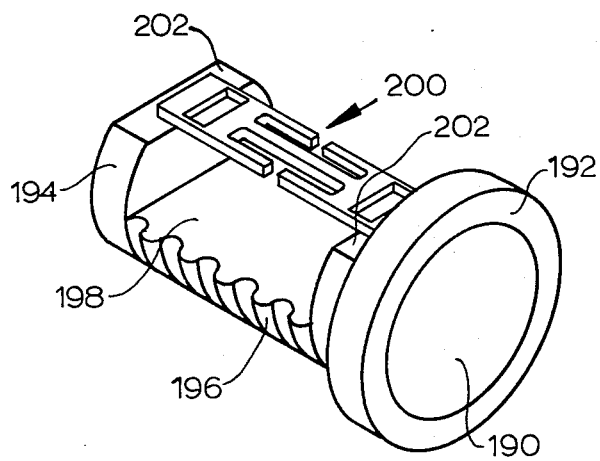
FIG. 12 is an isometric view illustrating a pressure vessel in the form of a bending bellows with partial convolutions and a flat section applying loads to a force-sensing resonator.

FIG. 12 illustrates an embodiment of this invention in which the closed-end, noncircular cross-section pressure vessel has the form of a partial bellows with a flat section to produce bending loads. The pressure vessel has an open port 190 and is attached and sealed to fixed structure 192. Closed end 194 contains the applied pressure within the pressure vessel. A series of flexible corrugations or convolutions 196 partially circumscribe the pressure vessel and interface to a relatively flat portion 198. load-sensitive resonator 200 is attached between closed end 194 and fixed structure 192 through mounts 202. When pressure is applied to inlet port 190, bending loads are generated about a neutral axis parallel to flat portion 198. These loads compress resonator 200 and change its frequency of oscillation, which is a measure of the applied pressure.

Figure 13:
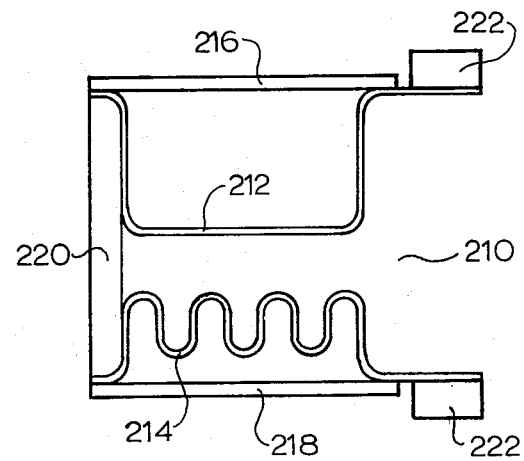
FIG. 13 is a plan view illustrating a bending bellows with partial convolutions and a flat portion applying loads to a push-pull dual resonator arrangement.

FIG. 13 illustrates an embodiment of this invention utilizing a push-pull, dual-resonator system in conjunction with a pressure vessel similar to that depicted in FIG. 12. As pressure is applied to inlet port 210, bending forces are generated about an axis approximately parallel to flat portion 212 due to the asymmetry associated with partially circumscribed convolutions 214 and flat portion 212. The bending forces simultaneously compress resonator 216 and tense resonator 218, which are mounted between the pressure vessel's closed end 220 and fixed structure mounts 222. The difference frequency between resonators 216 and 218 is a measure of the applied pressure.

Figure 14:
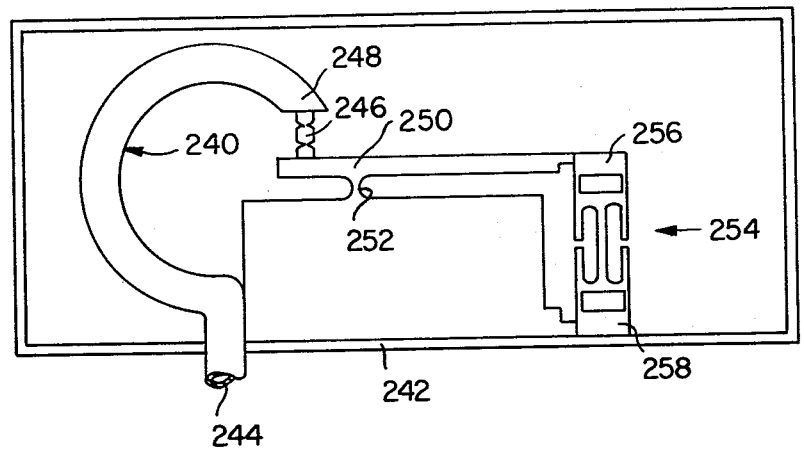
FIG. 14 is a plan view of a Bourdon tube mounted in an evacuated air-tight enclosure and having an external fluid port.

FIG. 14 illustrates a digital pressure transducer in which a curved pressure vesssel 240 is mounted within an air-tight enclosure 242. The interior of the pressure vessel 240 receives external fluid pressure through port 244. As in the embodiment of FIG. 6, pressure applied to the inlet port 244 generates an upward force on flexible linkage 246. The flexible linkage 246 is connected between the closed end 248 of the pressure vessel and pivotally mounted suspension arm 250. The pressure-generating force on suspension arm 250 produces a torque about pivot 252. The torque is restrained by load-sensitive resonator 254, which is attached between mounting pad 256 on the suspension arm 250 and mounting pad 258 on the fixed base. Pressure-induced compressive loading on the resonator 254 changes its frequency of oscillation, which is a measure of the applied pressure. The air-tight enclosure 242 is preferably evacuated so that the resonator 254 mounted within the enclosure 252 measures absolute pressure.

I claim:

1. A transducer for providing an electrical signal having a frequency indicative of a differential fluid pressure, comprising:

a resilient, elongated pressure vessel having at least one closed end, said pressure vessel having an interior and an exterior between which said differential pressure is applied, said pressure vessel having a nonsymmetrical configuration so that it bends responsive to variations in said differential pressure; and a force-sensitive crystal resonator generating said electrical signal, said resonator having at least one resonant element connected between a pair of mounts, said resonant element having sufficient compressional stiffness that its resonant frequency is dependent on the elastic properties of said resonant element and the compression or tension applied to said resonant element so that the frequency of said electrical signal is a function of the force applied to said resonator through said mounts, said mounts being coupled to said pressure vessel so that the force applied to said resonant element varies in accordance with said differential pressure.

2. The transducer of claim 1 wherein said pressure vessel is a curved tube of noncircular cross-section and the mounts of said resonator are secured to respective spaced-apart areas of said tube.

3. The transducer of claim 1 wherein said pressure vessel is a curved tube of noncircular cross-section and the mounts of said resonator are secured, respectively, to an area of said tube and a fixed base.

4. The transducer of claim 1 wherein the elasticity of said pressure vessel at one side thereof is significantly different from the elasticity of said pressure vessel at the opposite side thereof so that said pressure vessel bends responsive to variations in said differential pressure.

5. The transducer of claim 1, further including a second resonator coupled to said pressure vessel in opposed relationship to said first resonator so that said first resonator is stressed in the opposite direction from said second resonator responsive to bending of said tube, whereby the difference in frequency of the respective electrical signals from said resonators is indicative of said differential pressure.

6. The transducer of claim 1, further including coupling means connecting said pressure vessel to said resonator, said coupling means acting in a single direction, generally extending along both the direction of movement of said pressure vessel and the load-sensitive axis of said resonator.

7. The transducer of claim 6 wherein said coupling means comprise an elongated suspension arm secured to said pressure vessel and to said resonator, said suspension arm being mounted on a base through a pivot that is relatively compliant about an axis which is perpendicular to the load-sensitive axis of said resonator.

8. The pressure transducer of claim 1 wherein said vessel is a Bourdon tube of helical configuration so that said tube winds and unwinds responsive to variations in said differential pressure.

9. The pressure transducer of claim 1 wherein said vessel is a Bourdon tube of spiral configuration so that said tube curls and uncurls responsive to variations in said differential pressure.

10. The pressure transducer of claim 1 wherein said pressure vessel is a twisted tube of noncircular cross-section so that said tube twists and untwists responsive to variations in said differential pressure.

11. The pressure transducer of claim 10 wherein a pair of said resonators are mounted on opposite sides of said tube and coupled thereto by a force-transmitting member so that forces act on said resonators in opposite directions responsive to variations in said differential pressure, whereby the difference in frequency of the respective electrical signals from said resonators is indicative of said differential pressure.

12. The pressure transducer of claim 1 wherein said pressure vessel is of a generally U-shaped configuration having ends positioned adjacent each other.

13. The pressure transducer of claim 12 wherein the mounts of said resonator are connected to the respective ends of said pressure vessel so that the stress on said resonator varies in accordance with said differential pressure.

14. The pressure transducer of claim 13, further including a second resonator having one of its mounts connected to one end of said pressure vessel and its other mount connected to a fixed base so that the difference in frequency of the electrical signals from said resonators is indicative of the differential pressure applied to said pressure vessel.

15. The pressure transducer of claim 1 wherein said pressure vessel is a pair of arcuate members symmetrically positioned with respect to each other in opposite directions, the mounts of said resonator being connected to respective areas of said arcuate members so that the stress on said resonator varies responsive to variations in said differential pressure.

16. The pressure transducer of claim 1 wherein said pressure vessel is mounted in an airtight, evacuated enclosure so that said transducer measures absolute pressure.

17. The pressure transducer of claim 1 wherein said pressure vessel is closed at both of its ends so that it is hermetically sealed, said transducer further including an airtight enclosure having a fluid port to which a fluid pressure is applied, said pressure vessel being mounted within said enclosure so that said differential pressure is proportional to said fluid pressure.

18. The pressure transducer of claim 17 wherein the interior of said pressure vessel is evacuated so that said transducer measures absolute pressure.

19. The pressure transducer of claim 17 wherein said resonator is mounted inside said pressure vessel so that said resonator is isolated from said fluid pressure.

20. The pressure transducer of claim 19, further including a second resonator mounted inside said pressure vessel, said first and second resonators being symmetrically positioned on opposite sides of the neutral bending plane of said pressure vessel so that said resonators are stressed in opposite directions responsive to variations in said differential pressure.

21. The pressure transducer of claim 1 wherein said pressure vessel is closed at both of its ends so that it is hermetically sealed, whereby said pressure vessel bends responsive to the pressure of fluid surrounding said pressure vessel, said resonator being mounted inside said pressure vessel so that said resonator is isolated from the fluid surrounding said pressure vessel.

22. The transducer of claim 1 wherein said pressure vessel includes a fluid port receiving a fluid pressure for pressurizing the interior of said pressure vessel so that said pressure differential is proportional to said fluid pressure.

23. The pressure transducer of claim 1 wherein said pressure vessel is an enclosure having a relatively rigid planar wall and a relatively compliant undulating wall so that said pressure vessel flexes about a neutral bending plane responsive to variations in said differential pressure.

24. The pressure transducer of claim 23 wherein a pair of said resonators are positioned on opposite sides of said neutral bending plane so that the difference in frequency of the electrical signals from said resonators is proportional to said differential pressure.

25. The pressure transducer of claim 1 wherein said pressure vessel is mounted within an airtight enclosure and the interior of said pressure vessel receives external fluid pressure, said airtight enclosure being evacuated so that said transducer measures absolute pressure.

* * * * *